United States Patent
Plotkin

(10) Patent No.: US 9,163,857 B2
(45) Date of Patent: Oct. 20, 2015

(54) SPRAY STATIONS FOR TEMPERATURE CONTROL IN SOLAR BOILERS

(75) Inventor: Andrew Plotkin, Worcester, MA (US)

(73) Assignee: Babcock Power Services, Inc., Worcester, MA (US)

(*) Notice: Subject to any disclaimer, the term of this patent is extended or adjusted under 35 U.S.C. 154(b) by 1402 days.

(21) Appl. No.: 12/620,109

(22) Filed: Nov. 17, 2009

(65) Prior Publication Data

US 2010/0199976 A1 Aug. 12, 2010

Related U.S. Application Data

(60) Provisional application No. 61/151,984, filed on Feb. 12, 2009, provisional application No. 61/152,011, filed on Feb. 12, 2009, provisional application No. 61/152,035, filed on Feb. 12, 2009, provisional application No. 61/152,049, filed on Feb. 12, 2009, provisional application No. 61/152,077, filed on Feb. 12, 2009, provisional application No. 61/152,114, filed on Feb. 12, 2009, provisional application No. 61/152,286, filed on Feb. 13, 2009.

(51) Int. Cl.
| | |
|---|---|
| F24J 2/04 | (2006.01) |
| F24J 2/24 | (2006.01) |
| B60K 16/00 | (2006.01) |
| F03G 6/00 | (2006.01) |
| F24J 2/07 | (2006.01) |

(52) U.S. Cl.
CPC .. *F24J 2/07* (2013.01); *F24J 2/245* (2013.01); *Y02E 10/41* (2013.01); *Y02E 10/44* (2013.01)

(58) Field of Classification Search
CPC ............ Y02E 10/41; Y02E 10/44; F22G 5/12
USPC ............ 126/634, 651, 663; 60/641.8, 641.11, 60/641.15
See application file for complete search history.

(56) References Cited

U.S. PATENT DOCUMENTS

| | | | |
|---|---|---|---|
| 2,383,234 A | 8/1945 | Barnes | |
| 2,882,871 A * | 4/1959 | Koch | 122/478 |
| 3,197,343 A | 7/1965 | Palmatier | |
| 3,208,877 A | 9/1965 | Merry | |
| 3,325,312 A | 6/1967 | Sonntag, Jr. | |

(Continued)

FOREIGN PATENT DOCUMENTS

| | | | |
|---|---|---|---|
| FR | 2501839 A1 | 9/1982 | |
| JP | 53131309 A | 11/1978 | |

(Continued)

OTHER PUBLICATIONS

Steam its Generation and Use. 38. Babcock and Wilcox, 1975. 12-14 to 12-17.*

(Continued)

*Primary Examiner* — Avinash Savani
*Assistant Examiner* — Vivek Shirsat
(74) *Attorney, Agent, or Firm* — Locke Lord LLP; Joshua L. Jones

(57) ABSTRACT

A boiler for a solar receiver includes a plurality of solar receiver panels. The panels are fluidly connected to one another by way of a steam circuit. At least one spray station is in fluid communication with the steam circuit and is configured and adapted to provide temperature cooling spray into the steam circuit to control the temperatures of the panels.

17 Claims, 5 Drawing Sheets

(56) References Cited

U.S. PATENT DOCUMENTS

| | | |
|---|---|---|
| 3,450,192 A | 6/1969 | Hay |
| 3,459,597 A | 8/1969 | Baron |
| 3,464,402 A | 9/1969 | Collura |
| 3,822,692 A | 7/1974 | Demarest |
| 3,823,703 A | 7/1974 | Lanciault |
| 3,893,506 A | 7/1975 | Laing |
| 3,924,604 A | 12/1975 | Anderson |
| 3,927,659 A | 12/1975 | Blake et al. |
| 3,951,108 A | 4/1976 | Rees |
| 3,968,652 A | 7/1976 | Chevalier |
| 3,991,742 A | 11/1976 | Gerber |
| 3,995,804 A | 12/1976 | Folds et al. |
| 4,003,366 A | 1/1977 | Lightfoot |
| 4,037,639 A | 7/1977 | Jones |
| 4,088,266 A | 5/1978 | Keyes |
| 4,094,147 A | 6/1978 | Alleau et al. |
| 4,112,921 A | 9/1978 | MacCracken |
| 4,120,288 A | 10/1978 | Barrett |
| 4,127,102 A | 11/1978 | Berman |
| 4,127,103 A | 11/1978 | Klank et al. |
| 4,128,096 A | 12/1978 | Katz |
| 4,136,674 A | 1/1979 | Korr |
| 4,191,246 A | 3/1980 | Cassell |
| 4,204,523 A | 5/1980 | Rothe |
| 4,205,658 A | 6/1980 | Clark |
| 4,210,122 A | 7/1980 | Artweger |
| 4,215,676 A | 8/1980 | Gilliam |
| 4,237,861 A | 12/1980 | Fayard et al. |
| 4,245,618 A | 1/1981 | Wiener |
| 4,253,801 A | 3/1981 | O'Hare |
| 4,257,477 A | 3/1981 | Maloney |
| 4,261,330 A | 4/1981 | Reinisch |
| 4,265,223 A | 5/1981 | Miserlis et al. |
| 4,269,172 A | 5/1981 | Parker et al. |
| 4,273,100 A | 6/1981 | Cogliano |
| 4,280,483 A | 7/1981 | Schaffer |
| 4,289,114 A * | 9/1981 | Zadiraka ............ 126/587 |
| 4,296,730 A | 10/1981 | Zadiraka |
| 4,296,733 A | 10/1981 | Saunders |
| 4,312,687 A | 1/1982 | Sigworth, Jr. |
| 4,313,304 A | 2/1982 | Hunt |
| 4,320,663 A | 3/1982 | Francia |
| 4,324,229 A | 4/1982 | Risser |
| 4,338,991 A | 7/1982 | Sigworth, Jr. |
| 4,350,374 A | 9/1982 | Brollo |
| 4,353,356 A | 10/1982 | Vandenbossche |
| 4,359,043 A | 11/1982 | Dominique et al. |
| 4,367,726 A | 1/1983 | Maes, Jr. |
| 4,371,035 A | 2/1983 | Soligno |
| 4,373,512 A | 2/1983 | Hirt |
| 4,380,996 A | 4/1983 | Mengeringhausen |
| 4,384,550 A | 5/1983 | Miller |
| 4,394,859 A | 7/1983 | Drost |
| 4,404,960 A | 9/1983 | Laing |
| 4,416,265 A | 11/1983 | Wallace |
| 4,428,361 A | 1/1984 | Straza |
| 4,432,341 A | 2/1984 | Howe et al. |
| 4,454,863 A | 6/1984 | Brown et al. |
| 4,485,803 A * | 12/1984 | Wiener ............ 126/591 |
| 4,503,903 A | 3/1985 | Kramer |
| 4,512,336 A | 4/1985 | Wiener |
| 4,535,755 A | 8/1985 | Roberts |
| 4,569,331 A | 2/1986 | Tani et al. |
| 4,615,381 A | 10/1986 | Maloney |
| 4,653,470 A | 3/1987 | Carli et al. |
| 4,660,630 A | 4/1987 | Cunningham et al. |
| 4,665,894 A | 5/1987 | Juhasz |
| 4,712,338 A | 12/1987 | Trickel |
| 4,768,345 A | 9/1988 | Kardas |
| 4,825,664 A | 5/1989 | Vandervaart |
| 4,832,119 A | 5/1989 | Bloor et al. |
| 4,867,133 A | 9/1989 | Sadler |
| 4,946,512 A | 8/1990 | Fukuroi et al. |
| 4,972,806 A | 11/1990 | Marsault |
| 5,163,821 A | 11/1992 | Kelly et al. |
| 5,174,128 A | 12/1992 | Bourne et al. |
| 5,201,282 A | 4/1993 | Albrecht |
| 5,217,000 A | 6/1993 | Pierce-Bjorklund |
| 5,342,016 A | 8/1994 | Marsault et al. |
| 5,368,092 A | 11/1994 | Rearden et al. |
| 5,404,937 A | 4/1995 | Assaf et al. |
| 5,417,052 A | 5/1995 | Bharathan et al. |
| 5,444,972 A | 8/1995 | Moore |
| 5,482,233 A | 1/1996 | Marko et al. |
| 5,694,774 A | 12/1997 | Drucker |
| 5,727,379 A | 3/1998 | Cohn |
| 5,823,176 A | 10/1998 | Harris |
| 5,850,831 A | 12/1998 | Marko |
| 5,857,322 A | 1/1999 | Cohn |
| 5,862,800 A | 1/1999 | Marko |
| 5,881,456 A | 3/1999 | Bergins et al. |
| 5,943,985 A | 8/1999 | Hartman |
| 6,126,120 A | 10/2000 | Quaranta et al. |
| 6,155,339 A | 12/2000 | Grapengater |
| 6,173,927 B1 | 1/2001 | Delsol |
| 6,178,924 B1 * | 1/2001 | Hakulinen et al. ............ 122/7 R |
| 6,240,156 B1 | 5/2001 | Matsumoto et al. |
| 6,301,928 B1 | 10/2001 | Tanatsugu et al. |
| 6,434,942 B1 | 8/2002 | Charlton |
| 6,487,859 B2 | 12/2002 | Mehos et al. |
| 6,497,102 B2 | 12/2002 | Liebig |
| 6,532,953 B1 | 3/2003 | Blackmon et al. |
| 6,668,555 B1 | 12/2003 | Moriarty |
| 6,708,687 B2 | 3/2004 | Blackmon, Jr. et al. |
| 6,736,134 B2 | 5/2004 | Marko |
| 6,913,015 B2 | 7/2005 | Pajk |
| 6,926,440 B2 | 8/2005 | Litwin |
| 6,931,851 B2 | 8/2005 | Litwin |
| 7,011,086 B2 | 3/2006 | Litwin |
| 7,600,350 B2 | 10/2009 | Braunstein |
| 7,640,746 B2 | 1/2010 | Skowronski et al. |
| 7,806,377 B2 | 10/2010 | Strizki |
| 2001/0010222 A1 | 8/2001 | Prueitt |
| 2002/0029869 A1 | 3/2002 | Kodumudi et al. |
| 2003/0041856 A1 | 3/2003 | Blackmon et al. |
| 2004/0035111 A1 | 2/2004 | Ven et al. |
| 2004/0112374 A1 | 6/2004 | Litwin |
| 2004/0139961 A1 | 7/2004 | Blackmon et al. |
| 2004/0244376 A1 | 12/2004 | Litwin et al. |
| 2004/0251002 A1 | 12/2004 | Reichle et al. |
| 2004/0255571 A1 | 12/2004 | Fetescu et al. |
| 2005/0016524 A1 | 1/2005 | Broatch |
| 2006/0225863 A1 | 10/2006 | Levin |
| 2006/0260314 A1 | 11/2006 | Kincaid et al. |
| 2007/0089775 A1 | 4/2007 | Lasich |
| 2007/0119718 A1 | 5/2007 | Gibson et al. |
| 2007/0227531 A1 | 10/2007 | Garcia Cors et al. |
| 2007/0295382 A1 | 12/2007 | Oak |
| 2008/0000231 A1 | 1/2008 | Litwin et al. |
| 2008/0022685 A1 | 1/2008 | Zhu |
| 2008/0053523 A1 | 3/2008 | Brown et al. |
| 2008/0078378 A1 | 4/2008 | Zhu |
| 2008/0092551 A1 | 4/2008 | Skowronski |
| 2008/0256953 A1 | 10/2008 | Arkas et al. |
| 2008/0302357 A1 | 12/2008 | DeNault |
| 2009/0014057 A1 | 1/2009 | Croft et al. |
| 2009/0101134 A1 | 4/2009 | Merrett |
| 2009/0107146 A1 | 4/2009 | Lin |
| 2009/0114269 A1 | 5/2009 | Fletcher et al. |
| 2009/0114270 A1 | 5/2009 | Stancel |
| 2009/0199557 A1 | 8/2009 | Bennett |
| 2009/0250051 A1 | 10/2009 | Lata Perez |
| 2009/0260359 A1 | 10/2009 | Palkes |
| 2009/0276993 A1 | 11/2009 | Fedock et al. |
| 2010/0229853 A1 | 9/2010 | Vandal et al. |
| 2010/0236183 A1 | 9/2010 | Cusson et al. |

FOREIGN PATENT DOCUMENTS

| | | |
|---|---|---|
| JP | 08326223 A | 12/1996 |
| WO | WO-2008154599 A1 | 12/2008 |

OTHER PUBLICATIONS

U.S. Appl. No. 60/943,096, Kroizer.

(56) References Cited

OTHER PUBLICATIONS

International Search Report and Written Opinion, dated Aug. 30, 2010 for PCT/US2010/023124.
International Search Report and Written Opinion, dated Aug. 31, 2010 for PCT/US2010/023165.
International Search Report and Written Opinion, dated Oct. 13, 2010 for PCT/US2010/023622.
International Search Report and Written Opinion, dated Oct. 13, 2010 for PCT/US2010/023826.
International Search Report and Written Opinion, dated Dec. 13, 2010 for PCT/US2010/023367.
International Search Report and Written Opinion, dated Dec. 13, 2010 for PCT/US2010/023500.
Spanish Search report dated Aug. 8, 2013 issued in corresponding Spanish Patent Application No. 201190060.
Spanish Office Action dated May 12, 2014 issued in corresponding Spanish Patent Application No. 201190060.
Official Action issued by Israel Patent Office dated Mar. 24, 2014 for Israel Patent Application No. 214522.

* cited by examiner

SPRAY STATIONS FOR TEMPERATURE CONTROL IN SOLAR BOILERS

CROSS-REFERENCE TO RELATED APPLICATIONS

This application claims priority to U.S. Provisional Application No. 61/151,984, filed Feb. 12, 2009, to U.S. Provisional Application No. 61/152,011, filed Feb. 12, 2009, to U.S. Provisional Application No. 61/152,035, filed Feb. 12, 2009, to U.S. Provisional Application No. 61/152,049, filed Feb. 12, 2009, to U.S. Provisional Application No. 61/152,077, filed Feb. 12, 2009, to U.S. Provisional Application No. 61/152,114, filed Feb. 12, 2009, and to U.S. Provisional Application No. 61/152,286, filed Feb. 13, 2009, each of which is incorporated by reference herein in its entirety.

BACKGROUND OF THE INVENTION

1. Field of the Invention

The present invention relates to solar power production, and more particularly, to spray stations for temperature control of solar receiver panels in solar boilers.

2. Description of Related Art

Solar power generation has been considered a viable source to help provide for energy needs in a time of increasing consciousness of the environmental aspects of power production. Solar energy production relies mainly on the ability to collect and convert energy freely available from the sun and can be produced with very little impact on the environment. Solar power can be utilized without creating nuclear waste as in nuclear power production, and without producing pollutant emissions including greenhouse gases as in fossil fuel power production. Solar power production is independent of fluctuating fuel costs and does not consume non-renewable resources.

Solar power generators generally employ fields of controlled mirrors, called heliostats, to gather and concentrate sunlight on a receiver to provide a heat source for power production. A solar receiver typically takes the form of a panel of tubes conveying a working fluid therethrough. Previous solar generators have used working fluids such as molten salt that have the ability to store enough energy to allow power generation when there is little or no solar radiation. The heated working fluids are typically conveyed to a heat exchanger where they release heat into a second working fluid such as air, water, or steam. Power is generated by driving heated air or steam through a turbine that drives an electrical generator.

More recently, it has been determined that solar power production can be increased and simplified by using water/steam as the only working fluid in a receiver that is a boiler. This can eliminate the need for an inefficient heat exchanger between two different working fluids. This development has lead to new challenges in handling the intense solar heat without damage to the system. One such challenge is the fact that solar boilers can be subject to very rapid changes in temperature when compared to fossil fuel boilers. It is possible, for example, for solar receiver panels to go from a high-heat receiving state, to a state in which little or no heat is received, and then back to the high-heat receiving state within minutes. This can happen, for example, with the passing of a rogue cloud over the field of heliostats. In such instances, steam temperature will undergo huge fluctuations in a short period of time, which can damage the receiver panels.

While the known systems of solar power production have generally been considered satisfactory for their intended purposes, there has remained a need in the art for controlling steam temperature in the event of rapid changes in heat flux at the boiler panels. There is also a need for such systems and methods that are easy to make and use. The present invention provides a solution to these problems.

SUMMARY OF THE INVENTION

The subject invention is directed to a new and useful boiler for a solar receiver. The boiler includes a plurality of solar receiver panels. The panels are fluidly connected to one another by way of a steam circuit. At least one spray station is in fluid communication with the steam circuit and is configured and adapted to provide temperature cooling spray into the steam circuit to control the temperatures of the panels.

In certain embodiments, the boiler includes a plurality of boiler walls arranged end to end surrounding a boiler interior space. Each boiler wall includes a plurality of side by side solar receiver panels. Each panel can include a plurality of steam tubes fluidly connecting an inlet of the panel to an outlet of the panel.

In accordance certain embodiments, there are at least two spray stations in fluid communication with the steam circuit at separate locations from one another to directly control temperature of separate boiler walls or receiver panels. A control system can be operatively connected to the spray stations to independently control the spray stations for independent temperature control of at least two of the boiler walls.

It is also contemplated that the steam circuit can include two or more sub-circuits in parallel with one another. Each sub-circuit includes at least one spray station for independent temperature control of the sub-circuits. Each sub-circuit can include two spray stations separated apart from one another within each respective sub-circuit to provide temperature control for panels in separate locations, including for example, on separate sides of the plurality of boiler walls. Each sub-circuit can include one or more connector conduits, each fluidly connecting two separate passes of panels in the plurality of solar receiver panels. Two connector conduits in each sub-circuit can include one separate spray station each. Each sub-circuit can include a connector conduit fluidly connecting panels on one side of the plurality of boiler walls to panels on another side thereof, and each connector conduit can include a separate spray station. Each sub-circuit can include a connector conduit that is a cross-over conduit fluidly connecting panels on one side of the plurality of boiler walls to panels on an opposite side thereof. Each of the cross-over conduits can include a separate spray station.

The invention also provides a boiler for a solar receiver wherein a plurality of boiler walls are arranged end to end surrounding a boiler interior space. Each boiler wall includes a plurality of side by side solar receiver panels. The panels are fluidly connected to one another by way of a steam circuit. A cross-over conduit forms a portion of the steam circuit and fluidly connects panels on a first one of the boiler walls to panels on an second one of the boiler walls opposite to the first one of the boiler walls.

In accordance with certain embodiments, the steam circuit includes four passes of solar receiver panels with a first connector conduit fluidly connecting a first pass of panels with a second pass of panels. A second connector conduit fluidly connects a third pass of panels with a fourth pass of panels. The cross-over conduit fluidly connects the second pass of panels with the third pass of panels.

It is contemplated that the first and fourth passes of panels can be on opposite boiler walls from one another. The second and third passes of panels can be on opposite boiler walls from one another. Each pass of panels can be on a separate boiler wall from the other passes.

In accordance with certain embodiments, the four passes of panels, the first connector conduit, the second connector conduit, and the cross-over conduit form a first sub-circuit of the steam circuit, wherein the steam circuit includes a second sub-circuit in parallel with the first sub-circuit. The second sub-circuit includes four passes of panels substantially symmetrical with the four passes of panels in the first sub-circuit. The second sub-circuit includes a first connector conduit fluidly connecting a first pass of panels with a second pass of panels of the second sub-circuit. A second connector conduit fluidly connects a third pass of panels with a fourth pass of panels of the second sub-circuit. A cross-over conduit fluidly connects the second pass of panels with the third pass of panels of the second sub-circuit.

It is contemplated that in certain embodiments, a first spray station is provided in the first connector conduit of the first sub-circuit, a second spray station is provided in the cross-over conduit of the first sub-circuit, a third spray station is provided in the first connector conduit of the second sub-circuit, and a fourth spray station is provided in the cross-over conduit of the second sub-circuit. Each of the spray stations is configured and adapted to provide temperature control spray into the steam circuit to control temperature of the panels.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION OF THE PREFERRED EMBODIMENTS

Figure 1:
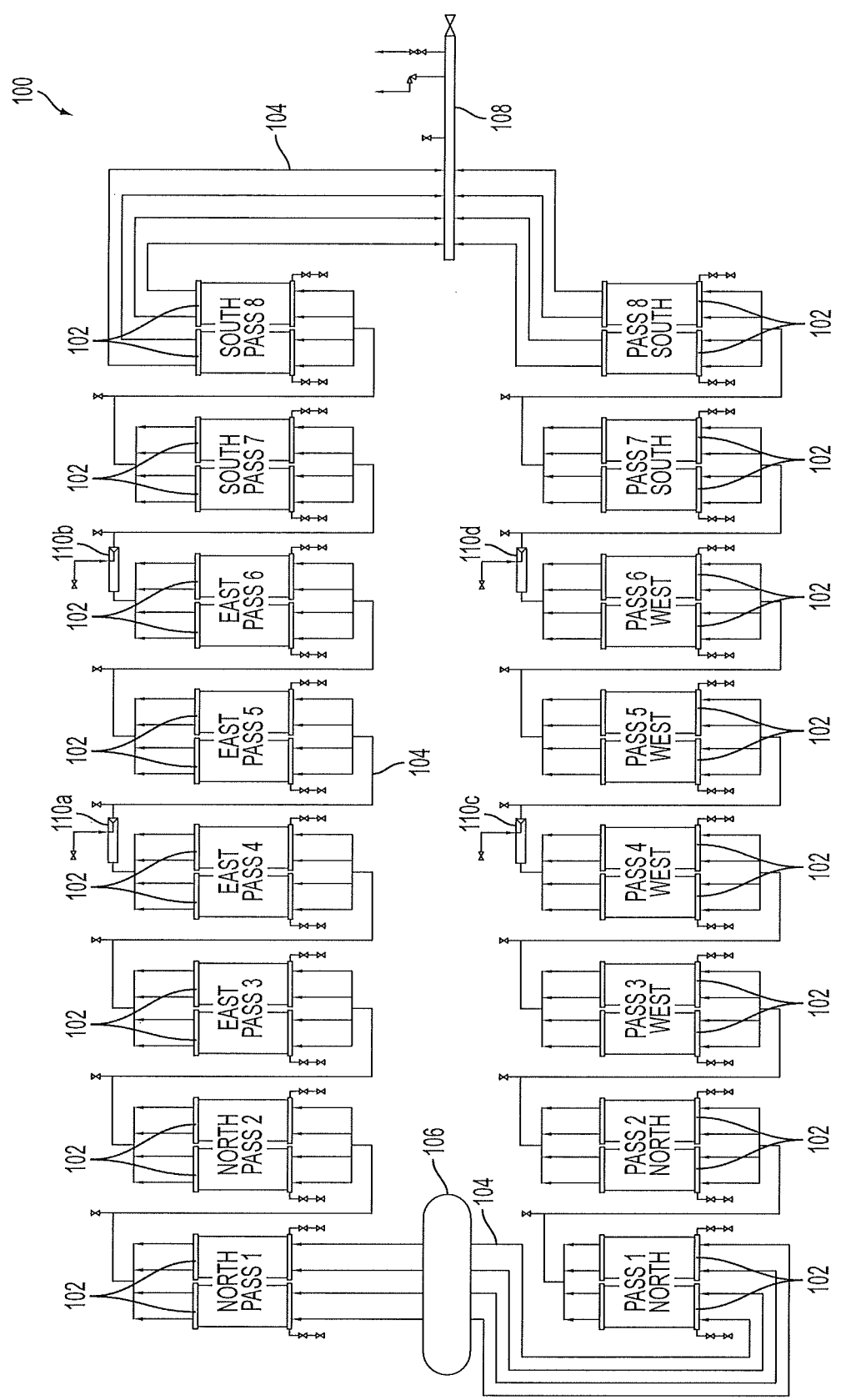
FIG. 1 is a schematic view of a portion of an exemplary embodiment of a solar boiler constructed in accordance with the present invention, showing schematically the placement of multiple spray stations for use in controlling temperatures of the receiver panels.

Reference will now be made to the drawings wherein like reference numerals identify similar structural features or aspects of the subject invention. For purposes of explanation and illustration, and not limitation, a partial view of an exemplary embodiment of a boiler in accordance with the invention is shown in FIG. 1 and is designated generally by reference character 100. Other embodiments of solar boilers in accordance with the invention, or aspects thereof, are provided in FIGS. 2-5, as will be described. The systems and methods of the invention can be used to improve control of boiler steam temperature, for example in solar power generation.

The solar boiler provides a unique problem in that the heat applied to the heating surfaces can go from full heat flux, to substantially no heat flux, and back to full heat flux, in a matter of minutes. An example of this is if a rogue cloud passes over the solar field, partially or totally blocking the sun. In such instances, the steam temperature can undergo considerable fluctuations over a short period of time. Heat flux fluctuations of such a high magnitude over such short periods of time do not typically occur in fossil fuel boilers, for example. In order to effectively control steam temperatures during these excursions of heat flux, interstage spray attemperation in between receiver panel groups is desirable to prevent overheating of the tubes.

As indicated in FIG. 1, boiler 100 is used as a solar receiver for solar power production. Boiler 100 includes a plurality of solar receiver panels 102. Each panel 102 has a plurality of steam tubes fluidly connecting an inlet of the panel to an outlet of the panel. Panels 102 are fluidly connected to one another in a steam circuit 104 including a drum 106 and a conduit 108 to a steam turbine or other power system. A plurality of spray stations 110a-110d are in fluid communication with the steam circuit 104. Spray stations 110a-110d are configured and adapted to provide a cooling spray to panels 102 to control the temperatures of the panels, for example during significant changes in heat flux received at the panels. Spray station 110a directly affects the steam temperature (and therefore the metal temperature) of the panels labeled east pass 5 and east pass 6. Spray station 110b directly affects the steam temperature (and therefore metal temperature) of the panels labeled south pass 7 and south pass 8, and so forth. Those skilled in the art will readily appreciate that more or fewer spray stations can be used, and in any suitable location without departing from the spirit and scope of the invention.

The schematic depiction in FIG. 1 is for a four-sided, eight pass boiler with two parallel sub-circuits of the main steam circuit 104. Each pass includes two individual boiler panels in parallel with one another within the respective steam circuit. The east sub-circuit includes two passes of panels on the north boiler wall, four passes on the east boiler wall, and two passes on the south boiler wall. The eight passes of the west sub-circuit are substantially symmetrical with the passes of the east sub-circuit, namely, two passes on the north boiler wall, four passes on the west boiler wall, and two passes on the south boiler wall. The four boiler walls each include a total of eight individual boiler panels 102. The four boiler walls are oriented with the cardinal compass directions, however, those skilled in the art will readily appreciate that any suitable orientation, number of boiler walls, or number of passes and panels can be used without departing from the spirit and scope of the invention.

Typically, in previously known systems, a single spray station is used to control steam temperature. Conventional boilers have used spray stations to limit the magnitude of the intermediate steam temperatures during steady state operation to avoid having to use high cost materials rated for higher temperatures, or to provide a wider range of spray flows in boilers that have variable fouling over their operating cycle. In the exemplary embodiment of the invention described above, there are two spray stations for each sub-circuit, e.g., the east sub-circuit and the west sub-circuit, of the boiler 100. Having two spray stations allows control of temperature in multiple locations, which is advantageous because there can be large changes in heat flux from pass-to-pass over time. For example, a cloud could block sunlight from the east side of a boiler, but not the other sides. Therefore, it is advantageous to have multiple locations to spray, depending on where the spray cooling effect or temperature control is needed.

Figure 2:
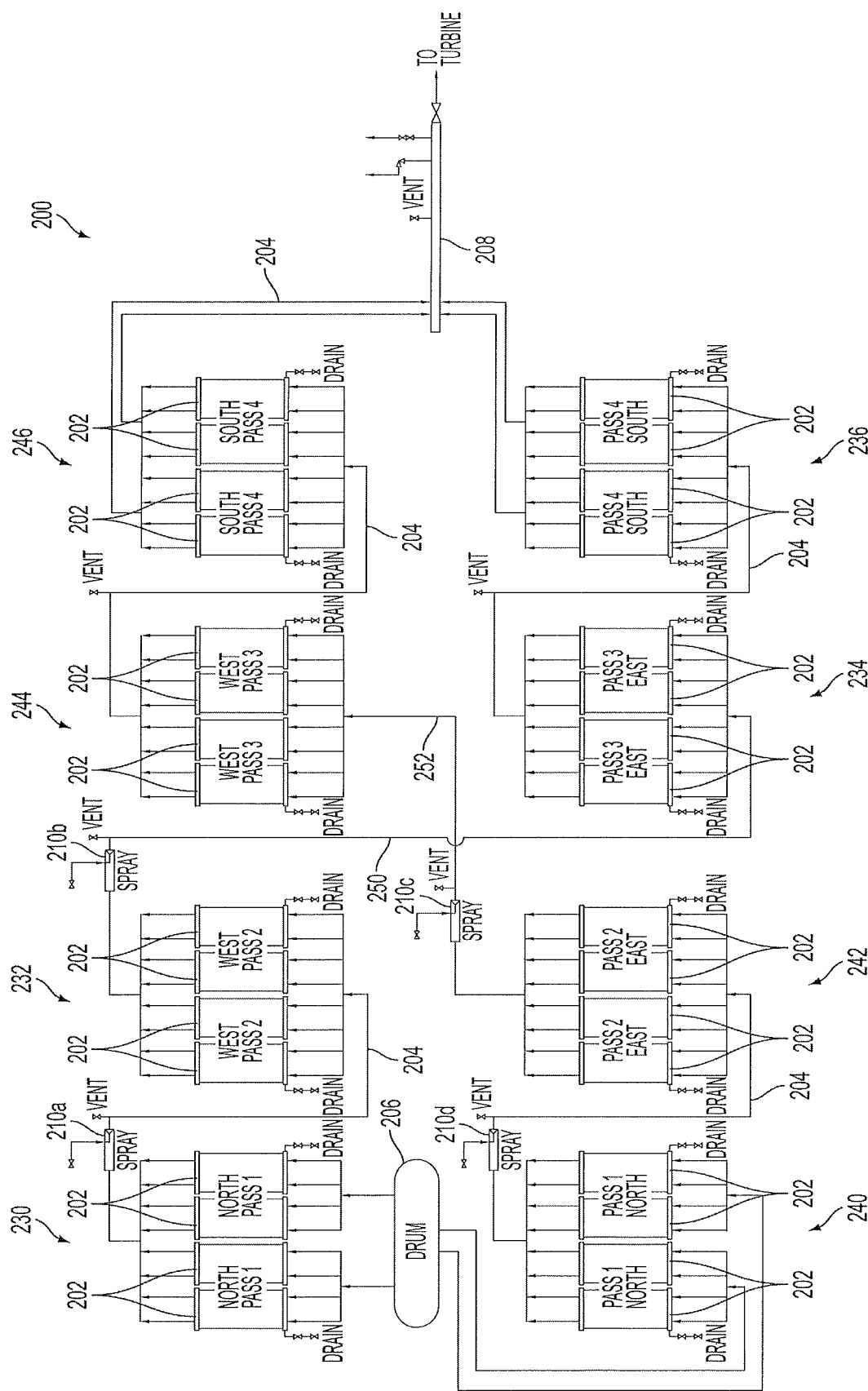
FIG. 2 is a schematic view of a portion of another exemplary embodiment of a solar boiler constructed in accordance with the present invention, showing schematically the placement of multiple spray stations in a cross-over, four-pass panel arrangement of two sub-circuits in a steam circuit.

Referring now to FIG. 2, another embodiment of a solar boiler 200 in accordance with the present invention is shown schematically. Similar to boiler 100 above, boiler 200 includes a steam circuit with two parallel sub-circuits, panels 202, a drum 206, and a conduit 208 to a steam turbine. Boiler 200 includes four passes instead of eight passes as in boiler 100. That is to say each sub-circuit is routed through a series four passes of panels between drum 206 and conduit 208. Each pass includes four parallel boiler panels, and each boiler wall includes a total of eight individual boiler panels.

With continued reference to FIG. 2, each sub-circuit includes a cross-over conduit 250, 252. The first sub-circuit routes steam from drum 206, through one pass 230 on the north boiler wall, through a connector conduit of circuit 204 that includes spray station 210a. From there, the steam is routed through one pass 232 on the west boiler wall, then through cross-over conduit 250, which includes a second spray station 210b. From there, the steam continues through one pass 234 on the east boiler wall, then through another connector conduit of circuit 204. Then the steam is routed through one pass 236 on the south boiler wall, and ultimately to conduit 208. Cross-over conduits can be of the same general size and configuration as the other connector conduits of circuit 204. It can be advantageous for cross-over conduits 250 to have a slightly larger pipe diameter than the other connector conduits to compensate for the fact that cross-over conduits 250, 252 have higher pressure drop than the other connector conduits due to the extra length of cross-over conduits 250, 252.

Figure 3:
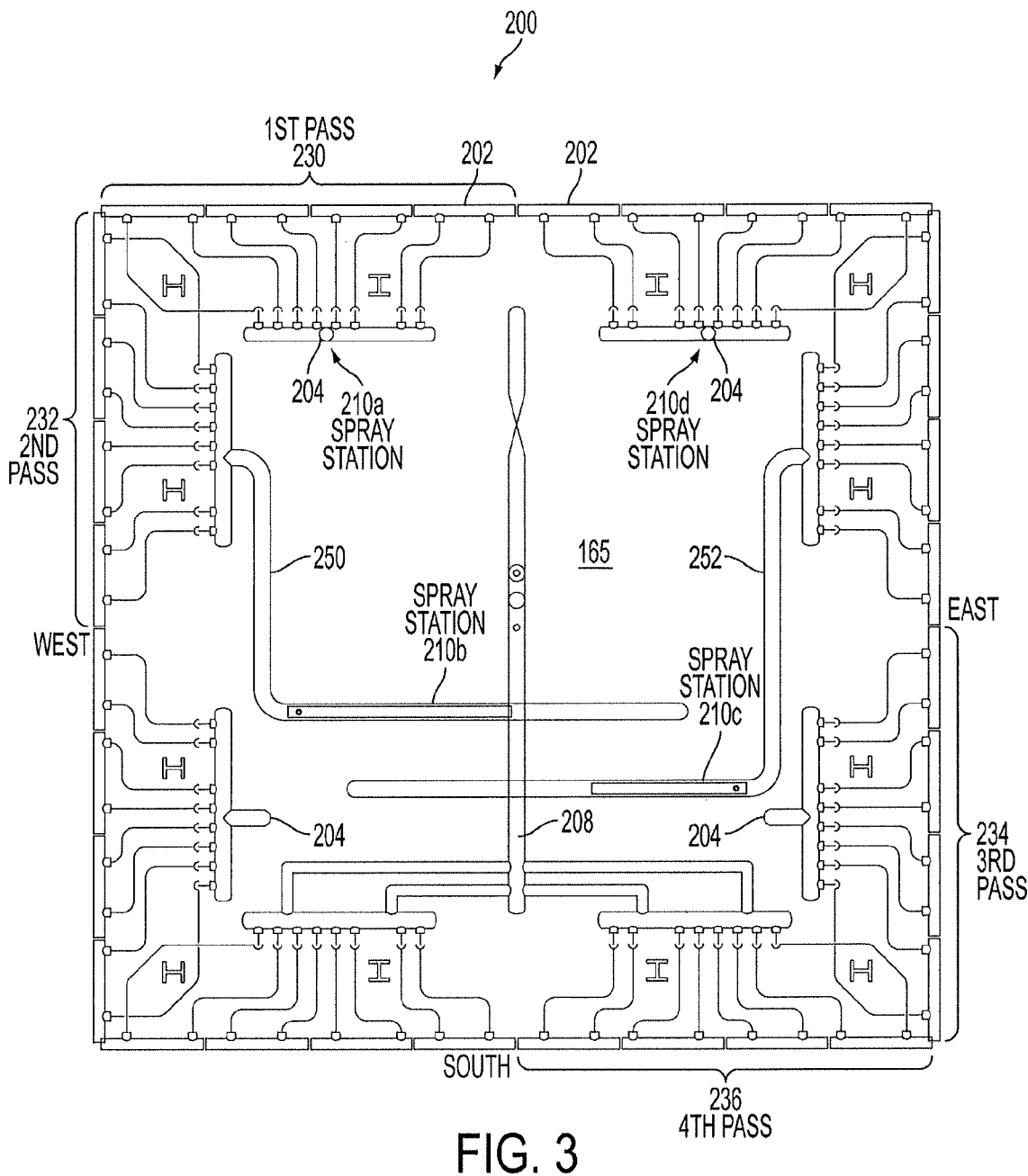
FIG. 3 is a schematic cross-sectional plan view of the solar boiler of FIG. 2, showing the locations of four spray stations in the steam circuit, and indicating the four passes of the first sub-circuit of the steam circuit.

Referring now to FIG. 3, boiler 200 is shown in cross-section from above, in a partially schematic view for clarity. The four passes of the first sub-circuit are shown in FIG. 3. First pass 230 includes the west most four panels 202 of the north boiler wall. The second pass 232 includes the north most four panels 202 of the west boiler wall and forms a corner of boiler 200 with first pass 230. From there the sub-circuit crosses over to the opposite boiler wall, where the south most four panels 202 of the east boiler wall make up the third pass 234. The east most four panels 202 of the south boiler wall make up the fourth pass 236, which forms a corner with third pass 234. The physical locations of the two spray stations 210a and 210b of the first sub-circuit are indicated in FIG. 3. Spray station 210a is shown end on within vertically oriented connector conduit 204, whereas spray station 210b is in a horizontal portion of cross-over conduit 250.

Referring again to FIG. 2, the second sub-circuit routes steam from drum 206, through one pass 240 on the north boiler wall, through a connector conduit of circuit 204 that includes spray station 210d. From there, the steam is routed through one pass 242 on the east boiler wall, then through cross-over conduit 252, which includes a second spray station 210c. From there, the steam continues through one pass 244 on the west boiler wall, then through another connector conduit of circuit 204. Then the steam is routed through one pass 246 on the south boiler wall, and ultimately to conduit 208.

Figure 4:
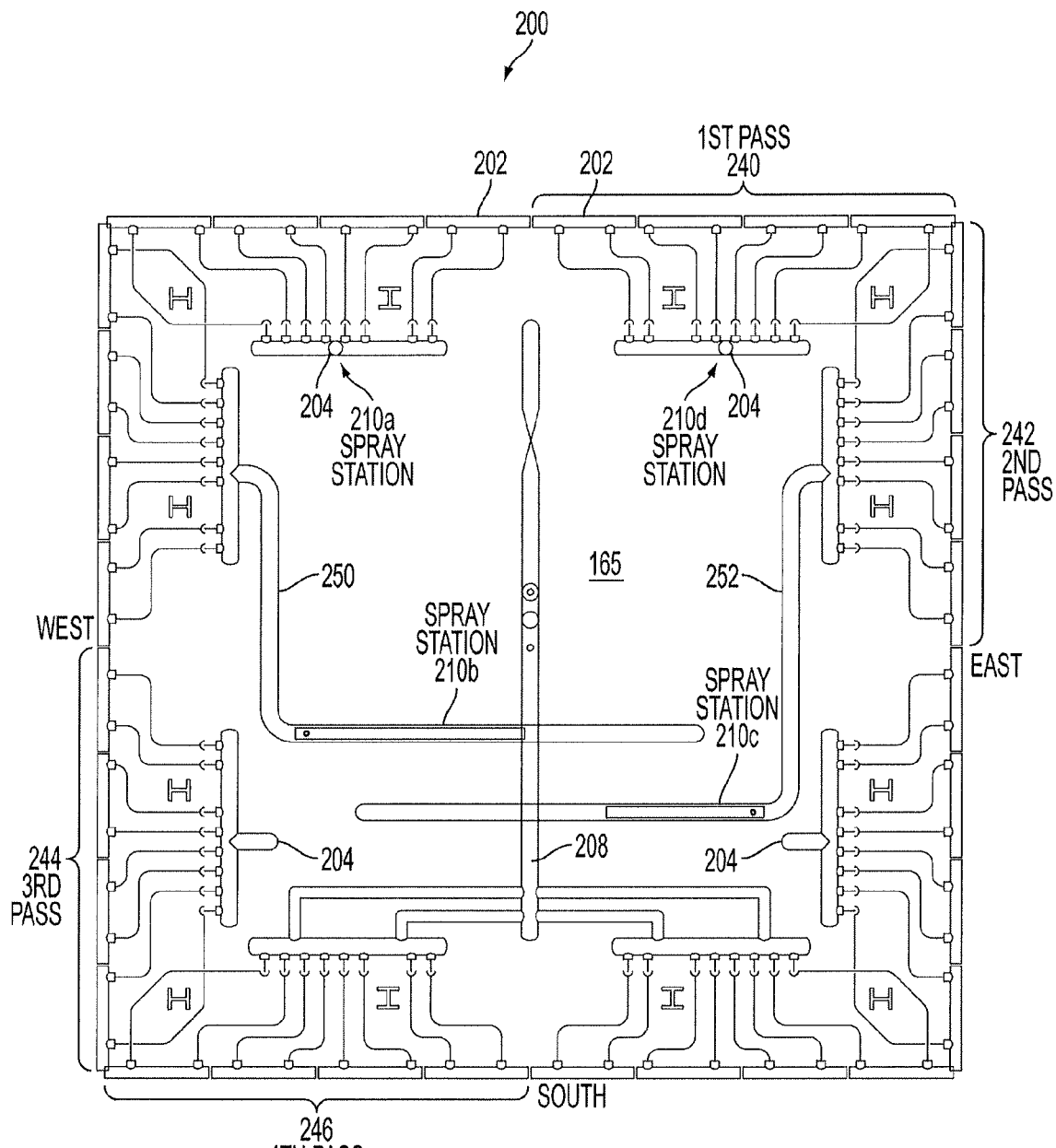
FIG. 4 is a schematic cross-sectional plan view of the solar boiler of FIG. 2, showing the locations of four spray stations in the steam circuit, and indicating the four passes of the second sub-circuit of the steam circuit.

With reference to FIG. 4, boiler 200 is shown as in FIG. 3, but with the passes of the second sub-circuit indicated. First pass 240 includes the east most four panels of the north boiler wall. The second pass 242 includes the north most four panels of the east boiler wall, and forms a corner with first pass 240. From there the sub-circuit crosses over to the opposite boiler wall, where the south most four panels of the west boiler wall make up the third pass 244. The west most four panels of the south boiler wall make up the fourth pass 246, which forms a corner with third pass 244. The physical locations of the two spray stations 210c and 210d of the first sub-circuit are indicated in FIG. 4. Spray station 210d is shown end on within vertically oriented connector conduit of circuit 204, whereas spray station 210c is in a horizontal portion of cross-over conduit 252.

As can be seen in FIGS. 3 and 4, boiler 200 includes four boiler walls arranged end to end surrounding a boiler interior space 165. Each boiler wall includes a plurality of side by side solar receiver panels 202. For sake of clarity, not all of the panels 202 are called out with reference characters in FIGS. 3 and 4. Each panel 202 includes a plurality of steam tubes fluidly connecting an inlet of the panel to an outlet of the panel, and foams a portion of steam circuit 204. The spray stations 210a, 210b, 210c, and 210d are each provided at separate locations from one another to directly control temperature of separate boiler walls. A control system can be operatively connected to the spray stations to independently control the spray stations for independent temperature control of at least two of the boiler walls. Independent temperature control of the sub-circuits and walls can be achieved through a combination of controlling the heliostats and the spray stations.

In ordinary operating conditions, primary spray stations 210a and 210d, are the only spray stations needed to maintain temperatures within an acceptable range, since more panels are located downstream of these spray stations and they therefore have the ability to control the steam temperature and protect the tubes of more panels than do spray stations 210b and 210c. The first passes 230, 240 typically require the most temperature control from a spray station because they receive the highest amount of heat flux since they receive energy from the southern sun, for example if boiler 200 is in the northern hemisphere. Spray stations 210b and 210c are available in case of significant need for cooling of temperatures in the second passes. The third passes 234, 244 are in series behind spray stations 210a, 210b, 210c and 210d and are thus directly affected when any of these spray stations are in use. The south side of the receiver is the coolest side if boiler 200 is located in the northern hemisphere, for example, since the sun in the southern sky reflects most directly off of the northern heliostats. Therefore it is not necessary to have dedicated spray stations for the fourth passes 236, 246. However, additional spray stations dedicated to the fourth passes 236, 246 can also be provided, without departing from the spirit and scope of the invention. Measures should be taken to ensure water droplets issued from the spray stations do not reach the steam turbine without being completely vaporized.

Boiler 200 is substantially symmetrical in that the four passes of the first sub-circuit are substantially symmetrical with the four passes of the second sub-circuit as viewed in FIGS. 3 and 4. Utilizing cross-over conduits 250, 252 allows each sub-circuit to include one pass facing each cardinal direction. The result is that both sub-circuits receive a more equal amount of heat input regardless of the position of the sun. Other configurations can also be used, for example having one sub-circuit with the four western most passes of the boiler, and another sub-circuit with the four eastern most passes. However, the cross-over configuration of boiler 200 has an advantage over such configurations when the sun is lower in the sky as in morning or evening operation. For example, in the morning when the sun is in the eastern sky, both sub-circuits of boiler 200 each have a high heat flux pass on the west side of the boiler where the most direct heating comes from the heliostats, and a lower heat flux pass on the east side, rather than one sub-circuit having both of the high flux western passes and the other sub-circuit having both of the lower flux eastern passes, for example.

Figure 5:
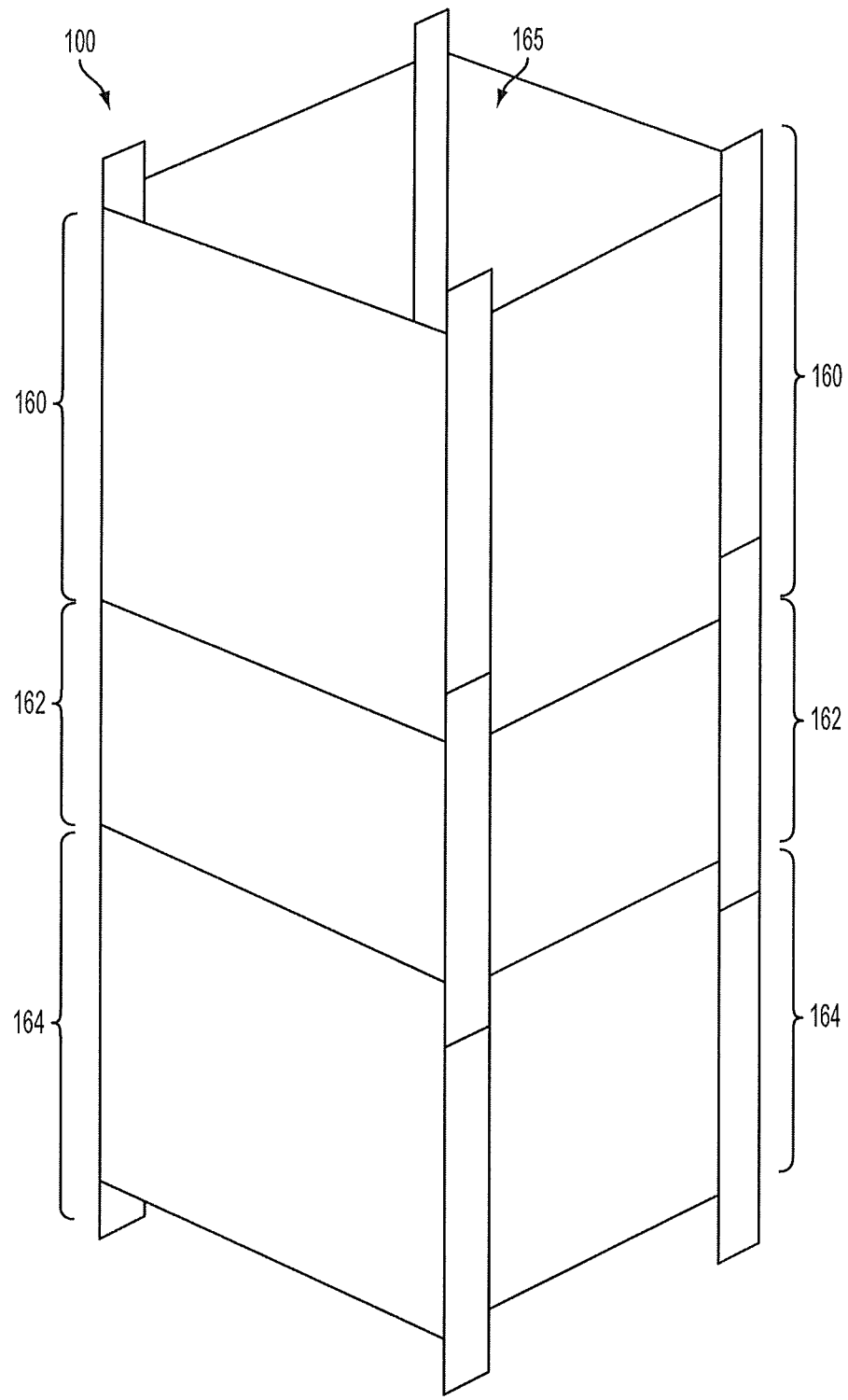
FIG. 5 is a schematic perspective view of an exemplary embodiment of a solar boiler constructed in accordance with the present invention, showing the stacking configuration of a steam generator section, a superheater section, and a reheater section wherein four boiler walls surround an interior boiler space.

With reference now to FIG. 5, boiler 100 is shown schematically with three vertically stacked sections. The middle section is a steam generator 162 which heats a steam/water mixture to saturation temperature, which is supplied to drum 106. Steam from drum 106 is delivered for further heating to superheater 160. Superheated steam from superheater 160 is supplied to a high pressure steam turbine, which returns the steam to reheater 164. Heat is added to the steam in reheater 164, and the re-heated steam is returned to the low pressure steam turbine. Superheater 160 and reheater 164 each include a steam circuit with spray stations as described above. Spray stations are not required for steam generator 162 because the entire section is at an equal saturation temperature.

Those skilled in the art will readily appreciate that any suitable number or configuration of passes, boiler walls, panels, and boiler sections can be used in accordance with the spirit of the invention. Moreover, any suitable spray station locations can be used without departing from the spirit and scope of the invention.

The methods and systems of the present invention, as described above and as shown in the drawings provide for enhanced control of temperatures in solar boiler receiver panels. This provides improved ability to protect the panels from large changes in solar radiation incident thereon. While the apparatus and methods of the subject invention have been shown and described with reference to preferred embodiments, those skilled in the art will readily appreciate that changes and/or modifications may be made thereto without departing from the spirit and scope of the invention.

What is claimed is:

1. A boiler for a solar receiver comprising:
    a) a plurality of boiler walls arranged end to end surrounding a boiler interior space, each boiler wall including a plurality of side by side solar receiver panels, wherein the panels are fluidly connected to one another by way of a steam circuit, wherein the steam circuit includes four heat transfer passes, wherein each heat transfer pass is on a respective boiler wall, wherein a first pass is on an opposite one of the boiler walls from a fourth pass and a second pass is on an opposite one of the boiler walls from a third pass for substantially uniform heating of the steam circuit regardless of the position of the sun; and
    b) a cross-over conduit forming a portion of the steam circuit and fluidly connecting panels on a first one of the boiler walls to panels on a second one of the boiler walls opposite to the first one of the walls, wherein the cross-over conduit includes at least one spray station in fluid communication with the cross-over conduit, wherein the at least one spray station is configured and adapted to provide temperature control spray into the steam circuit to control temperature of the panels, wherein the cross-over conduit passes fluid to an opposite side of the boiler.

2. A boiler as recited in claim 1, wherein there are at least two spray stations in fluid communication with the steam circuit, the at least two spray stations being fluidly connected at separate locations in the steam circuit from one another to directly control temperature of separate boiler walls.

3. A boiler as recited in claim 2, further comprising a control system operatively connected to the at least two spray stations to independently control the spray stations for independent temperature control of at least two of the boiler walls.

4. A boiler as recited in claim 1, wherein the steam circuit includes two sub-circuits in parallel with one another, each sub-circuit including at least one spray station for independent temperature control of the sub-circuits.

5. A boiler as recited in claim 4, wherein each sub-circuit includes two spray stations separated apart from one another within each respective sub-circuit to provide temperature control for panels on separate sides of the plurality of boiler walls.

6. A boiler as recited in claim 5, wherein each sub-circuit includes a connector conduit fluidly connecting panels on one side of the plurality of boiler walls to panels on another side thereof, wherein each connector conduit includes a separate spray station.

7. A boiler for a solar receiver comprising:
    a) a plurality of solar receiver panels, each panel including a plurality of steam tubes fluidly connecting an inlet of the panel to an outlet of the panel, wherein the panels are fluidly connected to one another by way of a steam circuit, wherein the steam circuit includes four passes of panels, wherein each pass of panels is on a respective boiler wall, wherein a first pass is on an opposite one of the boiler walls from a fourth pass and a second pass is on an opposite one of the boiler walls from a third pass for substantially uniform heating of the steam circuit regardless of the position of the sun; and
    b) a cross-over conduit forming a portion of the steam circuit and fluidly connecting panels on one side of the boiler to panels on an opposite side thereof, wherein the cross-over conduit includes at least one spray station in fluid communication with the cross-over conduit, wherein the at least one spray station is configured and adapted to provide cooling spray to the steam circuit to control temperature of the panels, and wherein the cross-over conduit passes fluid to an opposite side of the boiler.

8. A boiler as recited in claim 7, wherein there are at least two spray stations in fluid communication with the steam circuit, the at least two spray stations being fluidly connected at separate locations in the steam circuit from one another to directly control temperature of separate solar receiver panels.

9. A boiler as recited in claim 8, further comprising a control system operatively connected to the at least two spray stations for independent control thereof.

10. A boiler as recited in claim 7, wherein the steam circuit includes at least two sub-circuits in parallel with one another, each sub-circuit including at least one spray station for independent temperature control of the sub-circuits.

11. A boiler as recited in claim 10, wherein each sub-circuit includes two spray stations separated within the respective sub-circuit to provide temperature control for panels in separate locations.

12. A boiler as recited in claim 11, wherein each sub-circuit includes a plurality of connector conduits, each fluidly connecting two separate passes of panels in the plurality of solar receiver panels, wherein two connector conduits in each sub-circuit include one separate spray station each.

13. A boiler as recited in claim 7, wherein the steam circuit connects the four passes of panels in series with one another by way three connector conduits, each connector conduit fluidly connecting two separate passes of panels, wherein a first spray station is included in a first of the connector conduits that is in series between first and second passes of panels, and wherein a second spray station is included in a second of the connector conduits that is in series between second and third passes of panels.

14. A boiler for a solar receiver comprising:
a) a plurality of boiler walls arranged end to end surrounding a boiler interior space, each boiler wall including a plurality of side by side solar receiver panels, wherein the panels are fluidly connected to one another by way of a steam circuit, wherein the steam circuit includes four passes of solar receiver panels, wherein each pass of panels is on a respective boiler wall, wherein a first pass of panels is on an opposite one of the boiler walls from a fourth pass, and wherein a second pass of panels is on an opposite one of the boiler walls from a third pass for substantially uniform heating of the steam circuit regardless of the position of the sun; and
b) a cross-over conduit forming a portion of the steam circuit and fluidly connecting panels on a first one of the boiler walls to panels on an second one of the boiler walls opposite to the first one of the boiler walls, wherein the cross-over conduit includes a separate spray station in fluid connection therewith to provide temperature control, and wherein the cross-over conduit passes fluid to an opposite side of the boiler.

15. A boiler as recited in claim 14, wherein a first connector conduit fluidly connecting a first pass of panels with a second pass of panels, with a second connector conduit fluidly connecting a third pass of panels with a fourth pass of panels, and with the cross-over conduit fluidly connecting the second pass of panels with the third pass of panels.

16. A boiler as recited in claim 15, wherein the four passes of panels, the first connector conduit, the second connector conduit, and the cross-over conduit form a first sub-circuit of the steam circuit, wherein the steam circuit includes a second sub-circuit in parallel with the first sub-circuit, the second sub-circuit including four passes of panels substantially symmetrical with the four passes of panels in the first sub-circuit, the second sub-circuit including a first connector conduit fluidly connecting a first pass of panels with a second pass of panels of the second sub-circuit, with a second connector conduit fluidly connecting a third pass of panels with a fourth pass of panels of the second sub-circuit, and with a cross-over conduit fluidly connecting the second pass of panels with the third pass of panels of the second sub-circuit.

17. A boiler as recited in claim 16, further comprising:
a) a first spray station in the first connector conduit of the first sub-circuit;
b) a second spray station in the cross-over conduit of the first sub-circuit;
c) a third spray station in the first connector conduit of the second sub-circuit; and
d) a fourth spray station in the cross-over conduit of the second sub-circuit, wherein each of the spray stations is configured and adapted to provide temperature control spray into the steam circuit to control temperature of the panels.

* * * * *